Patented Dec. 6, 1949

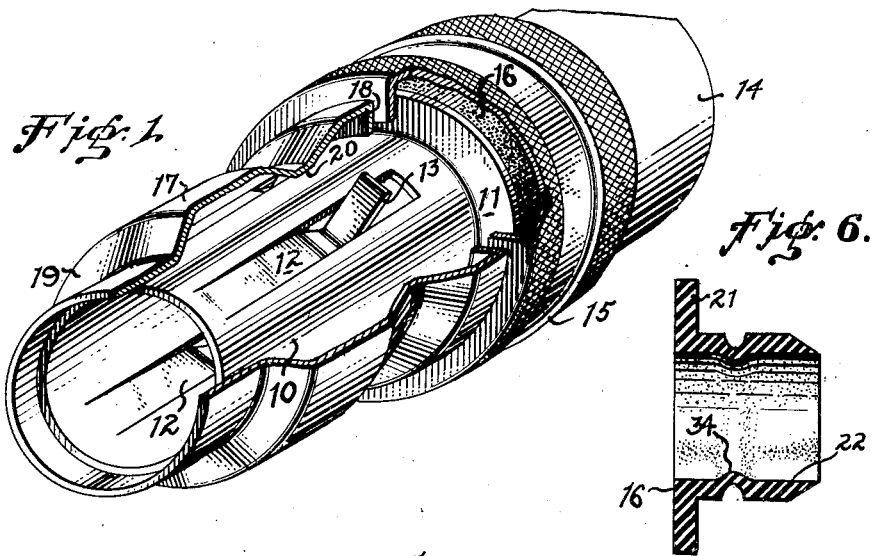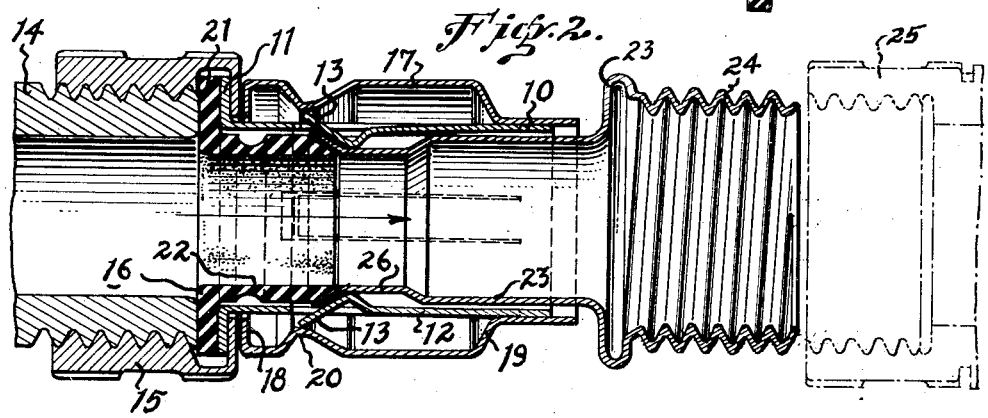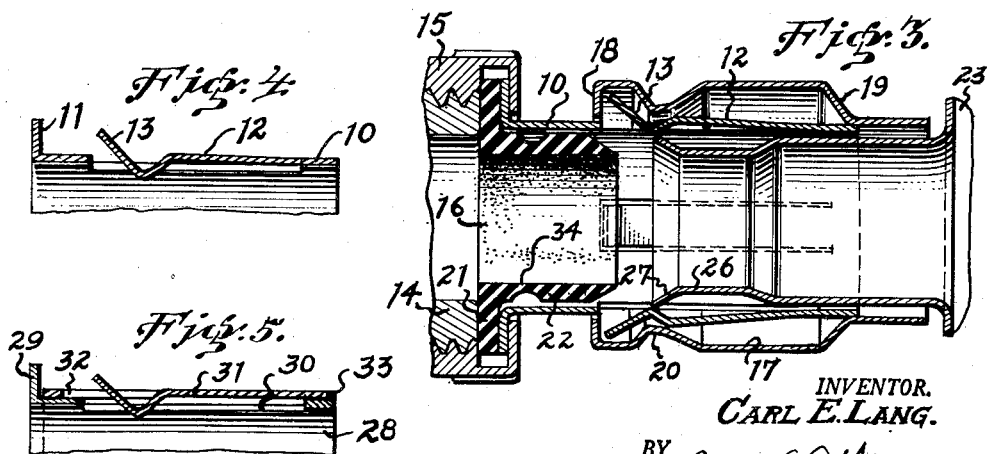

2,490,363

UNITED STATES PATENT OFFICE 2,490,363

HOSE COUPLING

Carl E. Lang, Oakland, Calif.

Application October 29, 1946, Serial No. 706,321

7 Claims. (Cl. 285—174)

1

The present invention relates to hose couplings and more particularly to a readily detachable coupling having parts which may be spun or drawn from sheet metal.

An object of the invention is to provide a simple and practical separable hose coupling, the parts of which may be drawn or spun from sheet metal in a simple and inexpensive manner.

Another object of the invention is to provide a coupling of the readily separable type which is simple and practical in construction.

Another object of the invention is to provide a coupling by which a hose may be conveniently attached to a source of fluid supply without special tools and in a rapid and efficient manner.

A further object of the invention is to provide a separable hose coupling of inexpensive construction having parts that are of spun or drawn sheet metal and of interlocking construction, whereby when applied to a service outlet the coupling may be firmly locked in place in a novel manner.

Other objects and advantages of the invention will be in part evident to those skilled in the art and in part pointed out hereinafter in the following description taken in connection with the accompanying drawing, wherein there is shown by way of illustration and not of limitation a preferred embodiment of the invention.

In the drawing:

Figure 1 is an enlarged perspective view of a portion of my improved coupling with a portion broken away to reveal the interior construction, Figure 2 is an enlarged longitudinal sectional view of the complete coupling with the parts in coupled relation, Figure 3 is a fragmentary sectional view similar to Figure 2 and showing the parts in an uncoupling position, Figures 4 and 5 show two different forms of one of the novel parts of the coupling, and Figure 6 is a sectional view showing a preferred form of gasket.

For a consideration of what I believe to be my invention reference is now made to the drawing where in Figure 1 there is shown the female portion of a complete coupling. As here illustrated this portion of my coupling is comprised of a tubular member 10 provided with an outwardly extending flange 11 at one end and a plurality of longitudinally and rearwardly extending flexible tongues 12 along its sides. These tongues 12 also have upset ends 13 which provide portions thereof that extend inwardly and outwardly from the inner and outer surfaces of the tubular member 10. In this showing the tubular member 10 is secured in coaxial relation upon the end of a fluid supply conduit 14 by means of a knurled and internally threaded collar 15 and interposed between the end of this fluid supply conduit 14 and the flange 11 of the tubular member 10 there is a gasket 16 of special construction as will hereinafter appear. Surrounding the tubular member 10 there is a slidable sleeve 17 which is flanged inwardly at its ends as at 18 and 19 so as to provide a clearance for the outwardly extending portions formed by the upset ends 13 of the tongues 12. Intermediate its ends the slidable sleeve 17 is also provided with a constricted portion 20 which is adapted to engage the externally disposed portions of the upset ends 13 of the tongues 12 when in one of its positions and thus hold the tongues 12 against outward flexing so as to render the inwardly disposed portions at the upset ends 13 thereof operable to lock a cooperating male portion of the coupling in sealing relation with the gasket 16.

Upon now referring to Figures 2 and 3 of the drawing it will be noted that the gasket 16 has an outwardly extending annular flange 21 at one end which is adapted to be clamped between the end of the fluid supply conduit 14 and the flange 11 forming upon the tubular member 10 and extending to one side of this flange 21 the gasket 16 has a cylindrical portion 22 which extends into the tubular member 10 and terminates adjacently upset ends 13 of the fingers 12. At its extending end the cylindrical portion 22 of the gasket 16 is of a length sufficient to cause it to be compressed when engaged by the end of a tubular male coupling member 23 which carries a threaded portion 24 of standard hose coupling dimensions to which a hose fitting 25, here shown by dot and dash lines, may be attached. In this showing the male coupling member 23, including its threaded portion 24, is shown as spun from a single integral length of tubing and at its inner end it has a constricted portion 26 of a diameter corresponding substantially to the internal diameter of the gasket 16. This constricted portion 26 serves to form an outwardly flaring cup-like seat 27 at the end of the male coupling member 23 into which a correspondingly tapered adjacent end of the gasket 16 is adapted to seat to form a fluid tight seal when the male and female coupling members 10 and 23 are brought into interlocking relation with each other. In addition to forming the outwardly flaring seat 27 at the end of the male coupling member 23 for the gasket 16 the constriction 26 also provides an annular recess for the internally extending portions at the upset ends 13 of the tongues 12. This will permit the upset ends 13 of the tongues 12 to flex inwardly and into interlocking relation with the outside of the flaring seat forming portion 27 and thus operate to retain the male coupling member 23 in sealing engagement with the compressible cylindrical portion 22 of the gasket 16. When the male coupling member 23 has thus been inserted into the tubular member 10 with its outwardly flaring seat 27 in sealing engagement with the gasket 16 the parts can be locked in this position by merely moving the slidable sleeve 17 to the left as viewed in Figure 2 of the drawing. This will bring the constricted portion 20 thereof over the outwardly and externally extending portions at the upset ends 13 of the tongues 12 and thus lock the parts together and prevent an inadvertent separation of the coupling members when in use. To this latter end it will be noted that the constricted portion 20 of the slidable sleeve 17 is inclined slightly along its inner surface so that it will tend to slide to the left, as here viewed, and be held in its locking position by the outward pressure exerting action of the fingers 12. Now should it be desired to disconnect the coupling members, the operator will only be required to move the slidable sleeve 17 to the right as here viewed. Then a pull upon the male coupling member 23 will cause the fingers 12 to be flexed outwardly as the flared seat forming portion 27 thereof is pulled thereunder. At this point it will be noted that the flange 18 at the inner end of the slidable sleeve 17 acts as a stop to prevent a complete removal of the sleeve 17 from the tubular member 10. At the same time this flange 18 will also serve to center the slidable sleeve 17 over the tubular member 10. The flanged portion 19 at the other end of the sleeve 17 terminates as a cylinder which will serve to center this end of the sleeve upon the tubular member 10.

As shown in Figures 4 and 5 of the drawings the construction of the tubular member 10 of my improved coupling may take different forms. For example, as shown in Figure 4 and as described above the tongues 12 may be formed as an integral part of the tubular member 10 by saw cuts or punching so that the tongues 12 with their upset ends 13 may be flexed independently of the tubular portion of this member. In practice it is considered that at least three of these tongues 12 will be provided in each coupling but it will be understood that any other number might be employed. In another form, as is shown in Figure 5 of the drawing, the tubular female portion of my coupling may be formed of a tubular member 28 having a flange 29 at one end and a plurality of elongated slots 30 arranged around its cylindrical portion through which flexible tongues 31 formed upon a separate cylindrical member 32, as above described, may be mounted. In this latter instance the flange 29 at one end of the tubular member 28 will operate to prevent axial movement of the cylindrical member 32 and at its other end the cylindrical member 28 may be peened outwardly as at 33 to secure the member 32 at this end.

As shown in Figure 6 of the drawing, another feature of my improved coupling resides in the particular form of the sealing gasket 16 which contemplates the use of a soft yielding material, such as rubber, and specially shaped with one or more collapsible portions 34 which will bow inwardly when the gasket 16 is subjected to a compressive stress as when the male and female parts of the coupling are engaged. These collapsible portions, only one of which is here shown, are arranged along the cylindrical portion 22 of the gasket 16. With this construction it will be seen that when the gasket is compressed lengthwise the collapsible portion 34 will tend to bow inwardly, as shown in this figure of the drawing, and thereby slightly constrict the diameter of the gasket 16 at this point. Then when the coupling is in use and a fluid under pressure is passed therethrough this collapsed portion 34 will be subjected to an outward pressure that will tend to return it to its original form and thus extend the cylindrical portion 22 and thus further insure a good sealing engagement with the flaring seat 27 at the end of the male member 23.

An important feature of the present invention and one which provides extreme economy and simplicity in manufacture is that all of the parts of my coupling except the retaining collar 15 and the sealing gasket 16 can be drawn from sheet metal and/or spun from tubular stock, and while I have, for the sake of clearness and in order to disclose the invention so that the same can be readily understood, described and illustrated specific devices and arrangements, I desire to have it understood that this invention is not limited to the specific means disclosed, but may be embodied in other ways that will suggest themselves to persons skilled in the art. It is believed that this invention is new and all such changes as come within the scope of the appended claims are to be considered as part of this invention.

Having thus described my invention, what I claim and desire to secure by Letters Patent is:

1. In a separable hose coupling, the combination of a cylindrical member adapted to be mounted in co-extensive relation at the end of a supply conduit, a flanged sealing gasket adapted to be secured to said supply conduit by said cylindrical member and having a cylindrical portion disposed within and extending toward the outer end of said cylindrical member, a cooperating coupling member for the end of a hose having a flared end adapted to project into said cylindrical member and encompass the extending end of said sealing gasket, a flexible locking means carried by said cylindrical member adapted to snap into locking engagement with the flared end of said cooperating coupling member and retain it in engagement with said gasket, and means carried by said cylindrical member adapted when in one position to engage said locking means and hold said cooperating coupling member in secured engagement with said gasket and when in another position permit a withdrawal of said cooperating coupling member from said cylindrical member by a pulling force sufficient to flex said locking means into an inoperative position.

2. In a separable hose coupling, the combination of a cylindrical member adapted to be mounted in co-extensive relation at the end of a supply conduit, a sealing gasket disposed within and extending in spaced concentric relation toward the outer end of said cylindrical member, a cooperating coupling member for the end of a hose adapted to project into said cylindrical member and extend over the end of said sealing gasket, a longitudinally extending flexible locking tongue carried by said cylindrical member adapted to normally flex inwardly and engage said cooperating coupling member and retain it in engagement with the end of said gasket, and means carried by said cylindrical member adapted when in one position to hold said flexible locking tongue into positive retaining engagement with said cooperating coupling member and when in another position to permit a flexing of said locking tongue and a withdrawal of said cooperating coupling member from said cylindrical member.

3. In a separable hose coupling, the combination of a fixed cylindrical member adapted to be mounted in co-extensive relation at the end of a supply conduit, a sealing gasket having a compressible cylindrical portion disposed within and extending toward the outer end of said cylindrical member, a cooperating male coupling member adapted for mounting upon the end of a hose having a tubular portion adapted to project into said cylindrical member and encompass the compressible portion of said sealing gasket, a plurality of longitudinally extending flexible tongues carried by said fixed cylindrical member adapted to normally flex inwardly to engage the tubular portion of said cooperating male coupling member and retain it in compressing engagement with the end of said gasket, and means slidably mounted upon said fixed cylindrical member adapted when in one position to hold said flexible retaining tongues in locking engagement with the tubular portion of the said cooperating male coupling member and when in another position to permit a withdrawal of said cooperating male coupling member from said fixed cylindrical member.

4. In a separable hose coupling, the combination of a cylindrical extension member adapted to be mounted in co-extensive relation upon the end of a fluid supply conduit, a sealing gasket disposed between said cylindrical extension member and said conduit having a compressible portion extending into said cylindrical extension member, a cooperating coupling member adapted to be mounted upon the end of a length of hose and having a flared end adapted to project into said cylindrical extension member and provide a cup-like seat for the end of the compressible portion of said sealing gasket, a plurality of longitudinally extending flexible retaining tongues carried by said cylindrical extension member adapted to normally engage behind the flaring end of said cooperating coupling member and retain it in cupping engagement with said gasket, and means slidably mounted externally upon said cylindrical member adapted when in one position to hold said flexible retaining tongues in fixed engagement of the flared end with the said cooperating coupling member and when in another position to permit an outward flexing of said tongues and a withdrawal of said cooperating coupling member from said cylindrical extension member.

5. In a separable hose coupling, the combination of a cylindrical extension member adapted to be mounted in fixed co-extending relation upon the end of a fluid supply conduit, a sealing gasket having a flanged portion disposed between said cylindrical extension member and said conduit and a compressible cylindrical portion extending into said cylindrical extension member, a cooperating coupling member adapted to be mounted upon the end of a length of hose and having a flared end adapted to project into said cylindrical extension member and over the end of the compressible portion of said sealing gasket, and a plurality of longitudinally extending flexible retaining tongues having upset ends carried by said cylindrical extension member adapted to flex inwardly behind the flaring end of said cooperating coupling member and retain it in compressing engagement with said gasket.

6. In a separable hose coupling, the combination of a tubular female member having a radially extending flange at one end adapted to be clamped in co-axial outwardly extending relation upon the end of a fluid supply conduit, a plurality of rearwardly extending tongues carried by said tubular female member having their ends upset to provide portions thereof extending internally and externally of said tubular member, a compressible gasket having a flange at one end adapted to be clamped between the end of said fluid supply conduit and the flange upon said tubular member and also an extending cylindrical portion terminating within said tubular member at the upset ends of said tongues, a tubular male member carried by the end of a length of hose having a constriction near its end forming an outwardly flaring inlet thereto and adapted to extend into said tubular member beyond the upset ends of said tongues, and a slidable cylindrical sleeve mounted externally upon said tubular member having a flange at one end engageable with the upset ends of said tongues to prevent its removal from said tubular member and a constricted portion intermediate its ends adapted to engage the upset ends of said tongues and flex them into locking relation with the flaring inlet of said male member and hold the latter member in compressing engagement with said gasket.

7. In a separable hose coupling, the combination of a tubular member adapted to be secured in co-axial outwardly extending relation upon the end of a fluid supply conduit, a plurality of tongues carried by and extending longitudinally of said tubular member with their ends upset to provide portions projecting internally and externally of said tubular member, a gasket having a collapsible portion extending into said tubular member and terminating at the upset ends of said tongues, a tubular male member adapted to be mounted upon the end of a length of hose having a constricted portion near its end forming an outwardly flaring seat for the end of said gasket and an interlocking surface for the internally disposed portions at the upset ends of said tongues, and a cylindrical sleeve slidably mounted externally upon said tubular member having a constricted portion intermediate its ends adapted to engage the externally disposed portions at the upset ends of said tongues and hold them in locking relation with the interlocking surface formed at the end of said male member when the latter member is in engagement with said gasket.

CARL E. LANG.

REFERENCES CITED

The following references are of record in the file of this patent:

FOREIGN PATENTS

| Number | Country | Date |
| --- | --- | --- |
| 342,467 | France | 1904 |